United States Patent
Spencer et al.

(10) Patent No.: US 12,221,788 B2
(45) Date of Patent: *Feb. 11, 2025

(54) ROOF COVER BOARD DERIVED FROM ENGINEERED RECYCLED CONTENT

(71) Applicant: Continuus Materials Intellectual Property, LLC, The Woodlands, TX (US)

(72) Inventors: Matthew Spencer, Palatine, IL (US); Marko Suput, Lompoc, CA (US); Marc Lower, The Woodlands, TX (US); Jack G. Winterowd, Puyallup, WA (US)

(73) Assignee: CONTINUUS MATERIALS INTELLECTUAL PROPERTY, LLC, The Woodlands, TX (US)

( * ) Notice: Subject to any disclaimer, the term of this patent is extended or adjusted under 35 U.S.C. 154(b) by 114 days.

This patent is subject to a terminal disclaimer.

(21) Appl. No.: 18/333,446

(22) Filed: Jun. 12, 2023

(65) Prior Publication Data

US 2023/0332410 A1    Oct. 19, 2023

Related U.S. Application Data (60) Continuation-in-part of application No. 17/237,315, filed on Apr. 22, 2021, now Pat. No. 11,718,995.
(Continued)

(51) Int. Cl.
*E04D 11/02* (2006.01)
*B32B 7/12* (2006.01)
(Continued)

(52) U.S. Cl.
CPC ............ *E04D 11/02* (2013.01); *B32B 7/12* (2013.01); *B32B 27/00* (2013.01); *B32B 27/14* (2013.01);
(Continued)

(58) Field of Classification Search
None
See application file for complete search history.

(56) References Cited

U.S. PATENT DOCUMENTS

| | | |
|---|---|---|
| 3,650,871 A | 3/1972 | Bentfors |
| 3,837,989 A | 9/1974 | McCoy |

(Continued)

FOREIGN PATENT DOCUMENTS

CN    1646315 A    7/2005

OTHER PUBLICATIONS

Extended European Search Report dated May 10, 2021, for corresponding European Patent Application No. 20214354.1.

*Primary Examiner* — Linda L Gray
(74) *Attorney, Agent, or Firm* — FOLEY & LARDNER LLP (57) ABSTRACT

Disclosed herein is an improved cover board product with a panel comprising a top surface layer comprised of paper or a fiberglass web; a bottom surface layer comprised of paper, a fiberglass web, nylon film, polyester film, polypropene film, or textiles; and a core layer comprised of paper and thermoplastic fragments connected by a thermoplastic bonding resin. The thermoplastic bonding resin is in a random pattern to less than 100% of the paper and thermoplastic fragment surface area.

20 Claims, 2 Drawing Sheets

Related U.S. Application Data which is a division of application No. 17/069,567, filed on Oct. 13, 2020, now Pat. No. 11,060,290.

(60) Provisional application No. 62/951,933, filed on Dec. 20, 2019.

(51) Int. Cl.

| | | |
|---|---|---|
| *B32B 27/00* | (2006.01) | |
| *B32B 27/14* | (2006.01) | |
| *B32B 27/32* | (2006.01) | |
| *B32B 37/00* | (2006.01) | |
| *B32B 37/06* | (2006.01) | |
| *B32B 37/08* | (2006.01) | |
| *B32B 37/10* | (2006.01) | |
| *B32B 37/12* | (2006.01) | |
| *B32B 37/24* | (2006.01) | |
| *B32B 38/00* | (2006.01) | |

(52) U.S. Cl.
CPC .............. *B32B 27/32* (2013.01); *B32B 37/00* (2013.01); *B32B 37/06* (2013.01); *B32B 37/08* (2013.01); *B32B 37/1045* (2013.01); *B32B 37/24* (2013.01); *B32B 38/00* (2013.01); *B32B 38/0004* (2013.01); *B32B 38/164* (2013.01); *B32B 2250/40* (2013.01); *B32B 2262/101* (2013.01); *B32B 2264/0257* (2013.01); *B32B 2264/062* (2013.01); *B32B 2264/12* (2013.01); *B32B 2305/026* (2013.01); *B32B 2305/22* (2013.01); *B32B 2305/30* (2013.01); *B32B 2305/70* (2013.01); *B32B 2307/3065* (2013.01); *B32B 2307/732* (2013.01); *B32B 2307/758* (2013.01); *B32B 2315/085* (2013.01); *B32B 2317/122* (2013.01); *B32B 2323/04* (2013.01); *B32B 2419/06* (2013.01)

(56) References Cited

U.S. PATENT DOCUMENTS

| | | |
|---|---|---|
| 9,126,204 B1 | 9/2015 | Toberman et al. |
| 10,400,188 B2 | 9/2019 | Toberman |
| 10,538,716 B1 | 1/2020 | Toberman et al. |
| 10,793,798 B2 | 10/2020 | Toberman |
| 11,060,290 B1* | 7/2021 | Rayman, Jr. ............ B32B 37/06 |
| 2010/0282632 A1 | 11/2010 | Schabel, Jr. |
| 2018/0266112 A1 | 9/2018 | Kelly |
| 2019/0257089 A1 | 8/2019 | Kelly |
| 2021/0238855 A1 | 8/2021 | Rayman et al. |

\* cited by examiner

ROOF COVER BOARD DERIVED FROM ENGINEERED RECYCLED CONTENT

CROSS-REFERENCE TO RELATED PATENT APPLICATION

This application claims the benefit under 35 U.S.C. § 120 as a continuation-in-part of non-provisional application U.S. Ser. No. 17/237,315, entitled "Roof Cover Board Derived From Engineered Recycled Content," filed Apr. 22, 2021, which is a divisional of the following non-provisional application U.S. Ser. No. 17/069,567, entitled "Roof Cover Board Derived From Engineered Recycled Content," filed Oct. 13, 2020, which claims the benefit under 35 U.S.C. § 119(e) of the following provisional application U.S. Ser. No. 62/951,933, entitled "Roof Cover Board Derived From Engineered Recycled Content," filed Dec. 20, 2019 all of which is incorporated herein by reference in its entirety.

BACKGROUND

Commercial roofs can be classified as either "low slope" or "steep slope". Low slope roofs have a pitch that is less than 25%. Most low slope roofs have a pitch of only 2%. Steep slope roofs have a pitch that is greater than 25%. Low slope roofs have excellent water and puncture resistance and longevity.

Low slope commercial roofs are comprised of four essential layers. The base of the assembly is typically a fluted steel deck. Less frequently, oriented strand board (OSB), plywood, or concrete are used as decking. A rigid insulating foam board, such as polyisocyanurate foam board or expanded polystyrene, is installed directly over the deck. A protective cover board is positioned directly over the insulating foam and is typically secured with screws that extend through the insulating foam and into the deck. A water-resistant membrane is then installed over the protective cover board and is attached to the cover board with either adhesives or mechanical fasteners.

Additional layers are sometimes incorporated into low slope roof assemblies. In many cases an air and vapor barrier, such as polyethylene film (6 mil thick) is installed between the deck and the insulating foam. In some cases, rock ballast or concrete pavers can be placed between the insulating foam and the cover board.

Many different membrane types can be used for low slope roofs. One of the most common is known as "built-up membrane roof" (BUR), which is generally comprised of alternating layers of asphalt and fiberglass felt. Bitumen is used to attach the BUR to the cover board. Modified bitumen (MB), thermoplastic single-ply membranes (polyvinyl chloride, thermoplastic polyolefin, polymers based on ketone ethylene ester) or thermoset single-ply membranes (including polymers based on ethylene propylene diene monomer) are also used as membranes. Yet another membrane type is mesh-reinforced membrane coating (MREC), which is based on alternating layers of acrylic elastomeric resin and polyester reinforcing mat. In many cases, these membranes are coated on the back side with an adhesive, but they can also be held in place with mechanical fasteners or ballast. In some cases, solvent-based synthetic rubber adhesives or polyurethane adhesives are applied to the cover board just prior to membrane installation. Sprayed polyurethane foam (2-component) is also used as a membrane. The polyurethane membrane bonds to cover board as it cures, which eliminates the need for adhesives or mechanical fasteners.

Commercial roofs serve an array of difficult functions. They protect the inside of the building from hot and cold external temperatures, as well as precipitation (rain, snow and hail) and extreme humidity conditions. Roof assemblies also have structural requirements. Specifically, they must support compressive loads due to foot traffic as well as solar panels, air conditioning units, and other equipment. Furthermore, the roof must be resistant to flame spread.

Designing a roof assembly to meet all of these requirements is quite challenging. For instance, low-density foams are commonly used to achieve the thermal barrier requirements of the roof. Unfortunately, these low-density foams are easily damaged by compressive or impact loads. Additionally, some of the most common foams used in roof assemblies lose their ability to provide adequate insulation properties if they become wet. Excessive moisture in the insulating foam can also enable the growth of bacteria and fungi, which can promote rot and other problems. Likewise, impact from hail stones or even heavy foot traffic can compress the foam and cause a reduction in insulating performance. Therefore, it is imperative that the insulating foam be protected from excessive compressive force, impacts, and water. Cover boards play a critical role in protecting the insulating foam in the roof assembly.

There is significant seasonal and regional variation in the frequency of precipitation events in North America, but on average they can occur about once every 2-3 days. To the extent that the insulating foam in the roof assembly can tolerate only a limited amount of water exposure, it is critical that the insulating foam is covered with the water-resistant top membrane as quickly as possible after foam installation. It is not the primary function of the cover board to provide water protection to the insulating foam, but it can be helpful for the cover board to resist water absorption and conduction for at least several hours during the roof assembly construction process. Any water absorbed by the cover board during the installation process could be trapped in the assembly after the membrane is installed. Thus, cover boards, which are installed between the foam and the membrane, must be fast and easy to install and should exhibit water resistance for several hours.

Fast cover board installation can be thwarted in re-roofing applications. In this situation a second roof assembly is installed directly over the original roof assembly. The original roof assembly will commonly have a curved contour along the perimeter where the flat portion of the roof intersects with the wall. Flashing is typically installed at this interface and it results in a curved transition. The installation problem along this curved perimeter is predominantly due to the lack of flexibility in existing cover boards. Specifically, existing roof cover boards have not been designed to accommodate this aspect.

Another challenge in roof systems involves wind "uplift" forces. This can occur as wind travels across the roof and creates an uplift force due to the venturi effect. It can also occur when the ventilation system creates positive pressure inside of the building and there are air leaks on the bottom side of the roof. In the second case, the roof assembly is subjected to the positive air pressure from inside of the building. In either case, the cover boards must have the mechanical strength to resist air pressure and secure the foam insulation. In general, cover boards should have an internal bond strength of at least 10 lb/in$^2$ (ASTM D1037) in order to provide adequate resistance to wind uplift forces.

In some cases, the cover board serves to resolve a material compatibility problem between the insulating foam layer and the membrane. For example, polystyrene foams should not be placed in direct contact with polyvinyl chloride (PVC) membranes due to plasticizer diffusion from the PVC into the polystyrene.

Some of the desired functions and attributes of cover boards in a roofing application represent apparent contradictions. For instance, cover boards must provide an upper major surface that is receptive to adhesives used to secure the membrane layer. In this capacity, the top surface of the cover board must allow for some level of absorption of both water-based and solvent based adhesives. However, the ideal cover board would also provide temporary resistance to the absorption of rainwater. A second apparent contradiction involves the need for the cover board to act as a substrate suitable for mechanical fasteners that might be used to attach membranes. Thus, the cover board must be strong enough to retain fasteners and to resist wind uplift forces. For many material types there is a correlation between strength and stiffness, but for a roof cover board application what is needed is a panel that is both strong and flexible.

It should also be recognized that temperatures on a roof vary substantially. For instance, night-time temperatures in the winter can be as low as −20° F., while temperatures on the same roof on a sunny day in the summer can be as high as 160° F. Thus, cover panels in the roof assembly must have an acceptable level of thermal dimensional stability in order to avoid buckling and detachment from adjacent layers in the roof assembly. This condition is significant because many engineering polymers could be utilized in a cover board panel to achieve a combination of strength and flexibility, but these same polymers exhibit poor thermal dimensional stability.

Cover boards used in low slope commercial roof assemblies include fiberglass mat-faced gypsum, fiber reinforced gypsum, cement panels, perlite, OSB and plywood. Less commonly, high density insulating panels (compressed polyisocyanurate core with coated glass mat facers), cement panels with reinforcement mesh, asphaltic panels (asphalt core with fiberglass facers), and mineral fiber board (stone wool or mineral fiber) can also be used as cover boards. All of these panels have deficiencies, including lack of sufficient flexibility, for a roof cover board application. What is needed is a cover board that provides impact protection to the insulating foam (from hail, foot traffic and heavy equipment), temporary water resistance, fire resistance, wind-uplift constraint, thermal dimensional stability, and flexibility for re-roofing applications. The coverboard should also be receptive to adhesives and mechanical fasteners.

SUMMARY

In a fused plate composite, irregular shaped plates of plastic and cellulose are combined under heat and pressure to form a solid mass. The resulting mass can be shaped into a variety of products including roof coverboards and other building materials. A fused plate composite relies mainly on thermoplastics within the matrix to act as a binder. The thermoplastics are melted to create a thermoplastic adhesive, the adhesive is allowed to flow and bind with neighboring cellulose (paper) fragments.

Several thermoplastics are fit for use in plastic paper composite. These thermoplastics include polyethylene, polypropylene, thermoplastic polyolefins commonly referred as TPO, PVC, polystyrene, and PET. Generally, thermoplastics with lower melt points, below 160° C., are preferred narrowing the list of primary candidates to polyethylene, polypropylene, and TPO. TPO is unique in that it combines polypropylene and polypropylene chemistries with the addition of rubber. Thus, TPO exhibits the desirable melting and flowing characteristics of both polyethylene and polypropylene.

Another desirable attribute of TPO is it is produced in abundance in North America, an estimated 350,000 tons of TPO is installed per year. TPO has a service life expectation of 20-25 years, meaning each year over 200,000 tons of TPO are removed from roofs and landfilled or burned. Additionally, TPO is compatible with current fuse plate composite manufacturing techniques. TPO lends itself to refining by shredding, granulating, or flaking, all practices currently associated with producing paper plastic composites. Once refined, TPO blends, conveys, and forms just as a mixture of cellulose and polypropylene or polyethylene would.

In short, TPO may be used as a direct substitute to polyethylene or polypropylene within a fuse plate composite. This can be done with no sacrifice to manufacturing complexity, through put of compromise on finished good performance.

Aspects of one embodiment of the present disclosure relate generally to a new and improved cover board product with a panel having dimensions of about 4' width×8' length× 0.125-0.75" thick. The panel is comprised of three discrete layers. A top surface layer is about 0.005-0.050" thick and is comprised of either paper or a fiberglass web. A bottom surface layer is about 0.005-0.100" thick and is comprised of either paper, a fiberglass web, nylon film, polyester film, polypropene film, or textiles such as cotton. A core layer is about 0.100-0.700" thick and is comprised of discrete paper fragments and polypropylene fragments, which are connected by use of a thermoplastic bonding resin, including polyethylene. TPO may be used as a direct substitute to polyethylene or polypropylene within a fuse plate composite. This can be done with no sacrifice to manufacturing complexity, through put of compromise on finished good performance. The bonding resin is generally attached in a random pattern to less than 100% of the paper fragment and polypropylene fragment surface area. The paper fragments are generally shaped as irregular plates with a diameter of about 0.050-2.000" and a thickness of about 0.005-0.050". The polypropylene fragments can have multiple shape types, some of which are irregular. In general, the largest dimension of the polypropylene fragments is about 2.000", while the smallest dimension is about 0.050". The thickness axis of the paper fragments is generally oriented orthogonally to the plane of the panel article. The two different fragment types are uniformly distributed in the core layer relative to each other. The level of paper fragments in the core layer is about 30-70% on a mass basis. The level of polypropylene fragments in the core layer is about 5-30%. The level of thermoplastic bonding resin in the core layer is about 10-40%. The density of the core layer is about 40-60 pcf. Thus, the core layer includes small voids in and around the particles, which improves flexibility. The core layer is attached to the top and bottom surface layers by use of a thermoplastic adhesive, including polyethylene.

The structure of the composite is designed to achieve compression load support, sudden impact resistance, wind uplift resistance, fastener retention, adhesive compatibility, temporary rain protection, low flame spread, thermal dimensional stability, and an exceptional level of mechanical flexibility. The design promotes rapid and easy installation of the cover board panel in a commercial low slope roof application. It is especially advantageous in re-roofing applications due to its exceptional level of flexibility, which allows it to more easily conform to the curved contour of the perimeter region of the roof. The top major surface allows for the absorption of adhesives but will temporarily resist transfer of rain water into the core layer of the board.

Preferred embodiments will perform better in a low slope roofing assembly than other commercially available cover boards, especially with regard to resistance to hail stone impact and mechanical flexibility. Preferred embodiments will be constructed using materials derived largely from municipal solid waste, post industrial waste or other recycled content. Each square foot of roof cover board diverts between 1.0 and 2.0 pounds of waste from landfills, waterways, or incinerators. The conversion process from waste to coverboard does not contaminate or render the ingredients of the coverboard harmful allowing for the coverboard to be easily recycled or remade. The recyclability of waste derived roof cover boards aligns with flat roof industry current practices of recycling flat roof membranes.

| Coverboard Competitive Set | Recycled Content | Ease of Recycling at The End of Service Life |
| --- | --- | --- |
| Gypsum Roof Coverboard | Up to 98% when the product is produced using fly ash. The remaining ~2% is fiberglass used as facer materials. | The gypsum industry is not structured to use recycled gypsum in their manufacturing process |
| OSB Roof Coverboard | None | The OSB industry is not structured to use recycled wood in their manufacturing process |
| Polyiso Foam Coverboard | None | The polyiso industry is not structured to use recycled foam in their manufacturing process |
| Waste Derived Coverboard | Up to 98%. The remain ~2% is facer materials. | The waste derived cover board manufacturing process allows cover boards to be recycled and remade in perpetuity |

Aspects of one embodiment of the present disclosure relate generally to a method of manufacturing an improved cover board product with a panel. In some embodiments, the method includes preparing fragments into an assembly; mixing the fragments and an adhesive into a blended core furnish; applying the adhesive to a top side of a bottom layer fabric in the assembly; forming a core mat of the blended core furnish on top of the adhesive; applying the adhesive to a top side of the core mat; applying a surface layer fabric on the top side of the adhesive; pressing the assembly; and cutting and trimming the assembly to form panels.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

In an example three-layered embodiment, the bottom layer of the composite can be a kraft paper, a fiberglass fabric, nylon film, polyester film, polypropene film or textiles such as cotton. Paper options can be untreated. Alternatively, papers can be coated or impregnated. Impregnation could be accomplished with phenolic or amino resins. The level of resin impregnation in the paper could be partial or saturated. Other sheet goods could be used as the bottom layer of the composite as long as they have a thickness of less than about 0.010" and are comprised of materials that will not melt or decompose at temperatures of less than about 400° F. Paper is a preferred bottom layer in the composite due to its strength, availability, low cost, and ability to withstand platen temperatures of about 400° F.

The top layer in the composite can be a fiberglass web or mat. Alternatively, paper or resin impregnated paper could be used as the top layer of the composite. If a resin impregnated paper is used, it is preferable that the resin level in the paper be less than the saturation point so that the paper retains some ability to absorb adhesives. Fiberglass webs are a preferred material for the top layer of the composite because they are strong, non-combustible, porous, and they have the ability to withstand platen processing temperatures of about 400° F.

It is beneficial for the fabric used in the top layer of the composite to have a flame spread rating of Class 'A' in the ASTM E84 test for the low slope roof cover board application. Fabrics comprised of fiberglass will be inherently more resistant to flame spread relative to other potential top layer materials, including paper. Flame spread resistance can be further improved by treating the top layer with an intumescent formula. Suitable intumescent formulas for this technology include aqueous, carbonific compositions based on pentaerythritol, ammonium polyphosphate and melamine or melamine resins. Fiberglass mats can be impregnated with intumescent formulas of this type. Upon drying, the formula will remain imbedded within the mat and will exist in a dormant state until it is heated above a temperature of about 450° F. This relatively high activation temperature allows the treated mat to be processed in a hot-press at a temperature of 400° F. without activating the previously applied intumescent formula. Thus, carbonific formulas can be incorporated into the top layer fabric prior to production of the composite, which is quite beneficial. In a fire event the temperature of the intumescent formula will exceed 450° F., which will cause the intumescent formula to expand and char. Both of these actions suppress fire. Other types of intumescent formulas, including those based on expandable graphite, can be applied to the top layer of the composite. However, intumescent coatings based on expandable graphite need to be applied to the top surface of the composite subsequent to panel production because the expandable graphite is activated at temperatures less than 400° F., which is the platen temperature used to produce the present technology. In many cases expandable graphite coatings are also more expensive than carbonific formulas, but expandable graphite coatings can have superior water-resistance. Other additives, such aluminum trihydrate, boric acid, halogenated compounds, melamine, and antimony-based compounds, can be incorporated into the top surface layer and/or other layers of the composite in order to improve fire resistance.

Paper fragments in the core layer are generally shaped as irregular plates with a diameter of about 0.050-2.000" and a thickness of about 0.005-0.050". Paper fragments can be made by milling larger pieces of paper until the disintegrated material passes a 1" mesh screen. The larger pieces of paper can be newspaper, advertising, office paper, packaging, or other paper products. The paper can be virgin material, or it can be recycled or sourced from waste streams. Generating paper fragments from waste or recycling streams has the advantage of being low cost and helps to resolve a worldwide sustainability problem. Paper having a thickness of less than about 0.010" is preferred. Paper having a thickness of less than 0.002" is most preferred. Thick paper (>0.010") based on multiple layers of fiber can be used but is less preferred. Thick paper tends to yield points in the composite with relatively low internal bond strength. The level of paper fragments in the core layer is about 30-70% on a mass basis. Preferred levels of paper fragments in the core layer are about 50-60%. Higher levels of paper fragments contribute to improved thermal dimensional stability. It should be emphasized that the cellulosic component in the core layer is "paper fragments", which are different in composition and their impact on panel properties than cellulosic fibers, wood flour or other wooden particles or elements.

Polypropylene fragments can have multiple shape types, some of which are irregular. In general, the largest dimension of the polypropylene fragments is about 2.000", while the smallest dimension is about 0.050". There are multiple ways to produce polypropylene fragments. One method involves isolating polypropylene articles from waste streams and then milling it until the disintegrated material passes a 1" mesh screen. Generating polypropylene fragments from waste streams has the advantage of being low cost and helps to resolve a world-wide sustainability problem. The irregular shape of the polypropylene fragments helps to achieve voids in the core layer of the composite. The existence of voids in the core layer helps to promote greater flexibility in the composite. The level of polypropylene fragments in the core layer is about 5-30%. Preferred levels of polypropylene fragments in the core layer are about 15-25%. Higher levels of polypropylene fragments contribute to improved mechanical properties, including compressive and bending strength. It should be emphasized that polypropylene fragments are different than polypropylene fibers Likewise, the use of polypropylene fragments in the core layer of this composite has property effects that are quite different than the effect of polypropylene in a composite based on cellulosic fibers embedded in an extruded polypropylene continuous phase.

Paper fragments and polypropylene fragments in the core layer are generally randomly distributed and are connected together with a thermoplastic adhesive with random connection points between the different fragments. Polyethylene is a preferred thermoplastic adhesive, but other thermoplastic resins that have a melt point between about 200-285° F. can be used. Examples of other suitable thermoplastic adhesives include polystyrene, copolymers of ethylene and vinyl acetate, copolymers of ethylene and butyl acrylate, copolymers of styrene and butadiene, methacrylate ester polymers, and some copolymers of ethylene and propylene. TPO may also be used as a direct substitute to polyethylene or polypropylene without sacrifice to manufacturing complexity, through put of compromise on finished good performance. Preferred thermoplastic adhesives have relatively low molecular weights, which allow them to melt, flow, and then freeze at a relatively fast rate. Selecting thermoplastic adhesives that have the ability to quickly cycle between molten and congealed states allows for faster press cycles in this technology during the panel manufacturing process. Melt flow index values can be used to help identify suitable thermoplastic adhesives for this application. Suitable thermoplastic adhesives will have a melt point between about 200-285° F. and a melt flow index (MFI) value greater than about 10 g per 10 minutes (374° F., 2 mm die orifice, 2060 g weight applied to the plunger). Preferred thermoplastic adhesives will have a MFI greater than about 50 g per 10 minutes. Most preferred thermoplastic adhesives will have a MFI greater than about 300 g per 10 minutes. Thermoplastic adhesives are generally free of water, which helps to reduce drying requirements associated with the production process. Thermoplastic adhesives are typically stable solids at room temperature. They have a very long shelf-life, they are safe to handle, and they are relatively easy to incorporate into the core layer of the composite through simple addition and mixing with the paper fragments and polypropylene fragments. The level of thermoplastic adhesive in the core layer is about 10-40%. Preferred levels of thermoplastic adhesive in the core layer are about 15-30%. Higher levels of thermoplastic adhesive contribute to improved mechanical properties, including compressive, bending and internal bond strength.

The density of the core layer is about 40-66 pcf. Thus, the core layer includes small voids in and around the fragments, which improve the level of flexibility of the panel.

A disadvantage of thermoplastic adhesives is that they are typically made and sold as pellets (diameter of about 0.010-0.200"). These pellets have a tendency to settle out of the mat subsequent to mat formation. Pellets that settle out of the mat are not able to contribute to bonding between the paper fragments and polypropylene fragments. Also, the relatively large pellets that remain in the mat melt slowly and the molten pellet contacts a limited number of paper fragments and polypropylene fragments, which minimizes the binder activity of the thermoplastic adhesive. Exemplary embodiments described herein resolve these problems by extruding the thermoplastic adhesive into a molten filament (diameter of about (0.0001-0.001") that is combined with the paper fragments and polypropylene fragments in a mixing process. The molten filament breaks into fibers as it contacts the tumbling mixture of paper fragments and polypropylene fragments. In this manner, the amount of fragment surface area that is in contact with the thermoplastic adhesive is substantially increased. Furthermore, the resulting thermoplastic fibers are partially adhered to fragments and they are in a shape that prevents them from settling out of the mat.

Thermoplastic adhesives can also be applied to the paper fragments and polypropylene fragments in the form of aqueous lattices or latex emulsions. In this approach the latex is sprayed onto the fragments in a mixer. Latex spray droplets cover a very high percentage of the surface area of the fragments at a relatively small application level. Thus, this represents a much more efficient way of distributing thermoplastic adhesive onto the surface of the fragments. This approach does result in increased water content of the fragment mat, which could be problematic in hot-pressing, especially if the mat has a moisture content greater than about 4-5%. Since many latex polymer emulsions have a solids content of about 40-50%, the maximum amount of latex that can be added to the paper fragments and polypropylene fragments is about 8-10%. In some cases, latex addition levels of only 2-10% could be highly beneficial.

Thermosetting adhesives could be used in place of the thermoplastic adhesive or as a supplement to the thermoplastic adhesive. Suitable thermosetting resins include isocyanates, polyurethanes, phenolic resins, amino resins, epoxy resins, crosslinked polysaccharides, and resins based on soy and poly (amide epichlorohydrin) (PAE). Thermosetting resins can potentially allow for faster production rates of the composite, as opposed to thermoplastic adhesives. The faster processing rates are due to the ability of the thermosetting resin to be rapidly converted from a liquid to a solid at elevated temperature. Thermosetting adhesives can generally cure at a rate that is faster than thermosetting resins can melt, flow and then congeal. Ideal thermosetting resins will exhibit strong adhesion towards both paper fragments and polypropylene fragments. Many thermosetting resins do not have this ability, but for this application a polyurethane resin based on polymethylene diphenyl diisocycanate (pMDI) and castor oil has the potential to bond strongly to both paper fragment and polypropylene fragments. Thermosetting adhesive levels in the core layer of the composite could range from about 0-15%.

When paper fragments and/or polypropylene fragments are generated from recycled streams or waste streams, they often have some odor. This odor tends to diminish during the hot-pressing process. In some cases, the finished composite panel can have some residual odor that could be objectionable. We have discovered that certain additives can be incorporated into the core layer in order to substantially reduce the odor. Effective odor blockers include activated carbon, zeolites, sodium carbonate and mixtures thereof. Suitable odor blocker levels are about 0.05-2.0% by weight of the core layer. Odor blockers can be introduced by dry mixing of the odor blocker, adhesive, paper fragments, and polypropylene fragments. Very fine odor blocker particles tend to distribute uniformly with the other core raw materials.

The core layer is attached to the top and bottom surface layers by use of thermoplastic adhesive. It is convenient to use thermoplastic adhesives in the form of films, but webs could also be used. Specifically, thermoplastic films or webs can be placed between the core and a surface layer. Subsequent application of heat and pressure converts the thermoplastic film or web into a sticky liquid, which effectively binds the two different layers together, especially subsequent to cooling and solidification of the thermoplastic adhesive. Alternatively, thermoplastic adhesive could be applied onto a major surface of one of the layers prior to the assembly and pressing process to achieve the same adhesion effect. Thermoplastic adhesives suitable for this function will have a melt point of about 190-320° F. When a fiberglass mat is used as the top layer, it will be helpful to use a thermoplastic adhesive between the top layer and the core that has a high molten viscosity at a temperature of about 320-400° F. so that the molten adhesive does not over-penetrate the fiberglass mat and foul the top press platen. In yet another approach, thermosetting adhesives could be used to join the three different layers. The adhesive application level between the layers of the composite can range from about 0.005-0.02 lb/ft$^2$.

The process for making the composite cover board involves multiple steps. Different embodiments may include different variations or arrangements of the steps, including additional or fewer steps. In a first step fragments of paper and polypropylene are generated by feeding relatively large sheets of paper and relatively large articles of polypropylene into a mill, which mechanically disintegrates the paper and polypropylene into fragments. The mill is equipped with a screen that has a mesh size of about 1". Thus, paper fragments and polypropylene fragments that are being processed inside of the mill will continue to be reduced in size until they are able to pass through the screen. In this manner, fragments will be generated that have a size of about 1" or less. If desired, a smaller or larger mesh size could be used to yield smaller or larger fragments. Optionally, thermoplastic adhesive could be processed through the mill as well. Different mills could be used for each of the fragment types or they could be processed together through the same mill. When a single mill is used, there will be a tendency for the three components to be mixed together. Additional mixing can be achieved by processing the components through a secondary blender. The secondary blender allows for the convenient application of additional adhesives and/or other functional additives. The secondary blender will be especially beneficial for the introduction of liquid additives or additives that need to be uniformly distributed within the core furnish. Optionally, the paper fragments only or the mixture of paper fragments and polypropylene fragments can be processed through a dryer prior to the secondary blender. The blended core furnish will then be conveyed to a forming station.

At the beginning of the forming station a bottom layer fabric (48" wide or greater) will be unwound onto a horizontal belt, which will convey the bottom layer fabric in a forward direction. An adhesive will then be applied to the top side of the bottom layer fabric. As previously stated, the adhesive could exist as a film or it could be a liquid, which could be applied as a spray, or a curtain, or it could be flood coated. Alternatively, the adhesive could be a thermoplastic that is applied to the bottom layer fabric in an extrusion process. The blended core furnish is then deposited on top of the previously applied adhesive. The basis weight of the core furnish will be about 1.5-2.5 lb/ft$^2$. Rakes or other devices can be used to ensure that the deposited core furnish is uniformly distributed at the targeted basis weight. More adhesive will then be applied to the top side of the core mat. Finally, the top layer fabric (48∝ wide or greater) will be unrolled and positioned over the adhesive that was previously applied to the core layer mat. In some cases, the resulting layered assembly will be processed through opposing rolls in order to compact it.

The resulting assembly will then be conveyed into a hot-press. The surface temperature of the top and bottom platens will be about 350-425° F. Pressure of about 20-800 lb/in$^2$ will be exerted on the assembly by use of the hot-press for a period of about 2-10 minutes. The applied pressure could be constant. Under this condition the thickness of the mat will actually decrease during the pressing event. Alternatively, the thickness of the mat can be held constant. Under this condition the pressure on the mat will initially be relatively high, such as 600-800 psi, and will decrease to about 50 psi, or even lower, as the pressing event continues. In general, the gap between the top and bottom platens during pressing will be about 0.25-1.00". A preferred gap between the platens is about 0.50" when the basis weight of the core furnish in the assembly is about 1.9-2.2 lb/ft$^2$. If the moisture content of the assembly is greater than about 4-5%, then venting cycles might be needed during the hot-pressing process. The hot, compacted assembly will then be processed through a cold press in order to freeze or congeal thermoplastic components in the composite. The cold press should have top and bottom platen surface temperature values of about 30-80° F. The pressure in the cold press will be maintained at about 5-25 psi. The gap between the platens should be equal to the targeted thickness of the resulting panel. The cold press time should be about 2-10 minutes and must be sufficient to cool the composite throughout its thickness to a temperature of less than about 190° F. Most ideally, the composite should be cooled to a temperature of less than about 110° F. prior to exiting the cold press.

Subsequent to cold pressing, the consolidated composite can be cut into panels, such as panels having a dimension of 4' wide×8' long, which are useful for a roof cover board application. Panels can be stacked, treated with edge sealant, banded and packaged.

A summary of example steps in the described composite manufacturing process includes:
1. Prepare fragments of paper and polypropylene.
2. Optionally, dry the paper fragments.
3. Mix the paper fragments, polypropylene fragments and adhesive into a blended core furnish. Optionally, additional additives can be incorporated into the core furnish at this step.
4. Apply adhesive to the top side of the bottom layer fabric.
5. Form a mat of the core furnish on top of the adhesive that was previously applied to the bottom layer fabric.
6. Apply adhesive to the top side of the core mat.
7. Apply a surface layer fabric on the top side of the adhesive that was previously applied to the top side of the core mat.
8. Hot-press the assembly.
9. Optionally, use venting cycles during the hot-pressing process.
10. Cold-press the assembly.
11. Cut and trim the consolidated assembly to form panels.
12. Stack the panels on pallets or bunks.
13. Optionally, apply sealant to the edge of the panels.
14. Band and optionally package the stacked panels.

Figure 1:
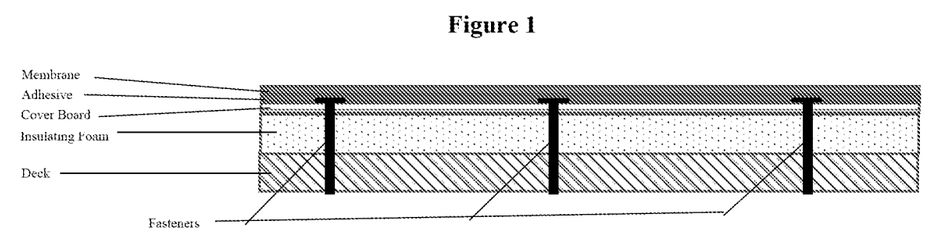
FIG. 1 is a cross-sectional view of layers in a low slope commercial roof system in accordance with an exemplary embodiment.
Figure 2:
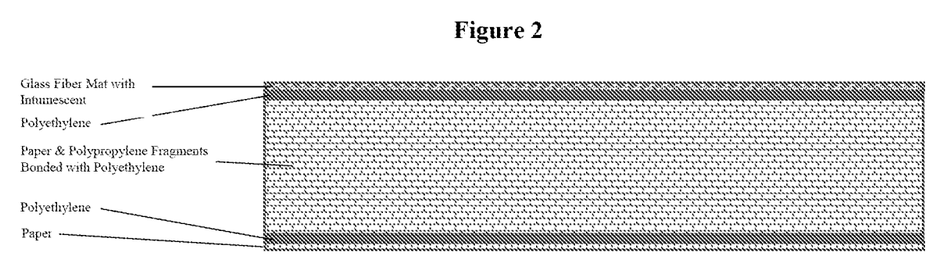
FIG. 2 is a cross-sectional view of layers in a three-layer flexible roof cover board in accordance with an exemplary embodiment.
Figure 3:
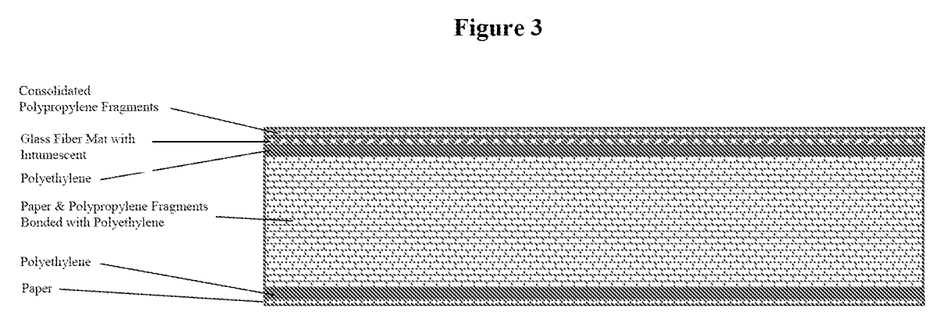
FIG. 3 is a cross-sectional view of layers in a four-layer flexible roof cover board in accordance with an exemplary embodiment.
Figure 4:
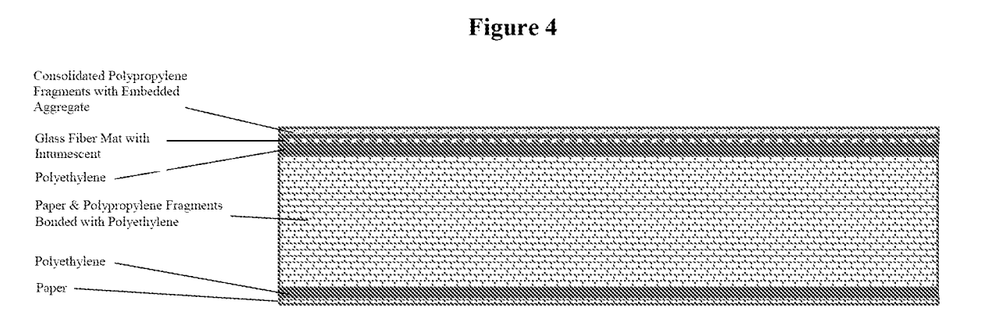
FIG. 4 is a cross-sectional view of layers in a four-layer plus aggregate flexible roof cover board in accordance with an exemplary embodiment.

In an example four-layered embodiment, additional layers can be incorporated into the composite to achieve improved resistance to hail stones and rain water. Specifically, a four-layered composite can be prepared. A bottom outer layer in this composite is paper, a fiberglass web, nylon film, polyester film, polypropene film, or textiles such as cotton (0.005-0.100" thick). Moving upward, a second layer is comprised of paper fragments and polypropylene fragments that are connected together with thermoplastic or thermosetting binder. Moving upward, a third layer is comprised of fiberglass web (0.005-0.010" thick) that has been treated with a carbonific intumescent for flame spread resistance. Moving upward, a fourth layer is comprised of consolidated polypropylene fragments. The fourth layer is created by depositing polypropylene fragments or other polypropylene particles onto the top side of the fiberglass mat prior to pressing. Alternatively, the top layer fragments or particles could be a different polymer with a melt point greater than about 300° F. The fragments are consolidated during the pressing process. See FIG. 3. As a further option, small aggregate could be added to the assembly on top of the upper fourth layer. Aggregate could include stone, glass, dust or wood chips. Said aggregate would be pressed into the polypropylene in the upper fourth layer, which could improve fire resistance and/or aesthetics. The lower three layers are connected together with polyethylene film (about 0.001-0.003" thick) or a suitable alternative thermoplastic or thermosetting adhesive. See FIG. 4.

Figure 5:
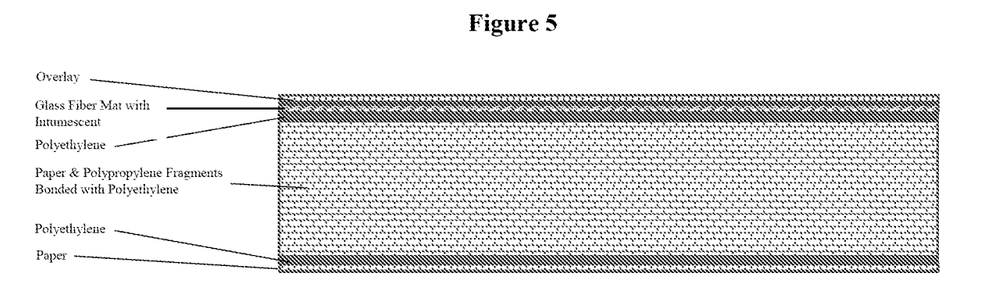
FIG. 5 is a cross-sectional view of layers in a three-layer plus an overlay flexible roof cover board in accordance with an exemplary embodiment.

Additional four layered embodiments can be achieved by incorporation of a fourth upper layer comprised of plastic sheets, additional fiberglass mat, resin impregnated paper (medium density or high density), melamine coatings, metals, fabrics or other sheet goods. The additional overlay could be incorporated into the composite during the primary production process or subsequent to the primary production process. The fourth upper layer can improve structural properties, water hold-out, air-barrier properties, and aesthetics. See FIG. 5.

Figure 6:
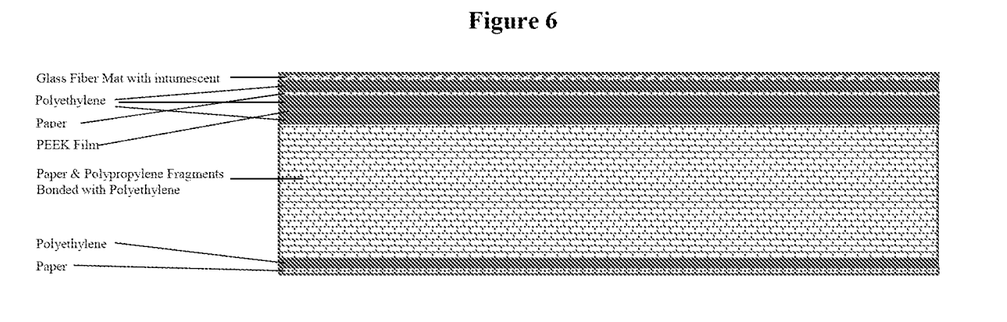
FIG. 6 is a cross-sectional view of layers in a five-layer flexible roof cover board in accordance with an exemplary embodiment.

In an example five-layered embodiment, additional layers can be incorporated into the composite to achieve improved resistance to hail stones and rainwater, but maintaining the ability to absorb adhesives. Specifically, a five-layered composite can be prepared. A bottom outer layer in this composite is paper, a fiberglass web, nylon film, polyester film, polypropene film, or textiles such as cotton (0.005-0.100" thick). Moving upward, a second layer is comprised of paper fragments and polypropylene fragments that are connected together with thermoplastic or thermosetting binder. Moving upward, a third layer is comprised of a film (0.0005-0.003") composed of polyether ether ketone polymer (PEEK), which has very high tensile strength, excellent puncture resistance and has almost no capacity to absorb water. Moving upward, a fourth layer is comprised of paper (0.005-0.100" thick). Moving upward, a fifth and top layer is comprised of glass fiber web (0.005-0.010" thick) that has been treated with a carbonific intumescent for flame spread resistance. The five layers are connected together with polyethylene film (about 0.001-0.003" thick) or a suitable alternative thermoplastic or thermosetting adhesive. The bonding resin connecting the fourth and fifth layers can be discontinuous in order to promote some level of absorption or fluid transfer through the fiberglass web and into the paper (fourth layer). The third layer (PEEK film) is continuous and is highly resistant to the absorption of water, solvents or oils. Interactions between the PEEK layer and the underlying core layer allow this composite to have exceptional levels of impact resistance, especially to hail stones. The upper surface of the composite also has the ability to absorb adhesives, but the composite will prevent water from passing vertically through to the underlying insulating foam. These valued properties are achieved while maintaining a high level of mechanical flexibility. This embodiment is illustrated in FIG. 6. PEEK films suitable for this invention are commercially available from Victrex USA Incorporated [West Conshohocken, PA] under the trade name APTIV 1000. Alternatively, similar embodiments could involve replacement of PEEK film with thin films that are wholly or partially comprised of different high performance thermoplastic polymers, including polyetherimides, polyether sulfones, or polyphenylene sulfides, which also have exceptional tensile strength, puncture resistance, hydrophobicity and melt points greater than 400° F. Likewise, the third layer in this composite could be partially or wholly comprised of high-performance thermosetting polymers, such as polydicyclopentadiene or a polyimide. In yet another embodiment, the third layer can be a resin impregnated paper.

By way of an example (Example 1), panels in accordance with the described embodiment were made in the following manner. A recycled waste stream was mined for paper, polyethylene and polypropylene materials. The isolated materials were milled to pass screens having a mesh size of 1" in order to yield a mixture of paper fragments (0.1-2.0" in diameter, 0.0005-0.010" thick), polyethylene fragments (0.1-2.0" in diameter, 0.0005-0.010" thick), and polypropylene fragments (0.1-2.0" in diameter, 0.0005-0.010" thick). The component ratio was about 60:20:20 by weight, respectively, on a dry basis. The moisture content of the paper fragments was about 25%. The fragments were uniformly mixed and then deposited onto a layer of low-density polyethylene film (48" wide, 3 mil thick) from Petoskey Plastics [Detroit, MI]. The polyethylene film was positioned over a layer of kraft paper, known as KL42, (54∝ wide, 42 lb per ream) manufactured by WestRock (Solvay, NY). Both the kraft paper and polyethylene film were transported on a horizontal conveyer while the fragments were being deposited. Fragments deposited on top of the polyethylene film were randomly oriented. The height of the deposited fragments was controlled with spinning rakes that were positioned about 3" above the polyethylene film in order to achieve a basis weight of the deposited fragments of about 2.2 lb/ft$^2$ (dry basis). A second layer of low-density polyethylene film (48" wide, 3 mils thick) was unwound over the top of the deposited fragments and a layer of fiberglass web with intumescent fire retardant (48" wide), known as WT FR 10SR—48¼ White, from Atlas Web Technologies [Atlanta, GA] was placed on top of the second layer of polyethylene film. Strips of kraft paper (3" wide, 42 lb/ream) were applied to the left and right edges of the top side of the mat adjacent to the fiberglass layer. The assembly was loaded into a first hot-press (54" width×8' length) with a bottom platen (T=385° F.) and a top platen (T=365° F.). The hot-press closed on the assembly and pressure (about 80 psi) was applied to the mat such that the gap between the top and bottom platens was maintained at about 0.50". After a period of 30 s the press opened for a period of 10 s in order to release steam that had developed in the core of the assembly. The press then cycled in a similar manner between closed and open positions seven more times, such that the total press time in the closed position was 4 minutes. The assembly was then transported to a second hot-press (of similar dimensions) and the same pressing cycle was repeated. The assembly was then transported to a third press (of similar dimensions). The platens on the third press were maintained at a temperature of only 60° F. The assembly was pressed in the cold press at a pressure of about 10 psi for a period of about 5 minutes and 20 seconds. The cold press remained closed during this entire pressing period (no venting cycles). The cold press was then opened, and the compressed assembly was transported to a set of saws that trimmed the edges of the assembly to a width of 48". The assembly was further cut into segments that were 8' in length. In this manner, panels (4'×8'×0.50") were generated. The edges of the panels were treated with a water-based edge sealant, known as CBS 156 RM Blue HP, and comprised of a mixture of water, colorant, wax and acrylic latex, from the Willamette Valley Company [Eugene, OR].

The resulting panel was useful as a cover board for roof assemblies. In this application the panel had exceptional flexibility that was particularly advantageous in re-roofing cover board applications. The panel was cut into test specimens (2"×2" and 3"×6"), which were subjected to internal bond and flexure tests (per ASTM D1037, 4.72" span for flexure, 0.05 inch/minute strain rate for both IB and flexure test). Density values of the specimens were also measured.

TABLE 1

Average Properties of Panel from Example 1.

| PROPERTY | AVERAGE VALUE |
| --- | --- |
| Internal Bond Strength | 25 lb/in$^2$ |
| Modulus of Rupture (Flexure) | 1,600 lb/in$^2$ |
| Modulus of Elasticity (Flexure) | 35,000 lb/in$^2$ |
| Density | 55 lb/ft$^3$ |
| Caliper | 0.50 inches |

The panel (upon being installed in an assembly comprised of plywood, polyisocyanurate foam, and cover board) was also able to resist an ice ball (2" diameter) impact at 105-110 feet/second without rupture of the top fiber glass fabric on the cover board. The top major surface of the panel supported a column of water without significant levels of absorption into the core layer for a period of 24 hours. Additionally, the panel achieved a Class 'A' rating for flame spread in the ASTM E84 test. Furthermore, it was receptive to common membrane adhesives and fasteners. This panel was particularly unique in that it had very high levels of flexibility.

As previously mentioned, cover boards used for low slope commercial roofs include gypsum with fiberglass surface layers, fiber reinforced gypsum, cement panels with paper surface layers, OSB and plywood. Unfortunately, these products are not sufficiently flexible at a level that is suitable for re-roofing applications (especially on the curved edge of the roof). Flexibility in panels can be generally expressed as a minimum bending radius, which is the minimum radius of a circle that could be made by bending, but not breaking the panel. The bending radius of a panel can be estimated through calculations and flexural MOE and MOR test values.

TABLE 2

Minimum Bending Radius Values for Roofing Cover Boards and Other Materials

| Panel Type | Density (lb/ft$^3$) | Thickness (inches) | Minimum Bending Radius (ft) |
| --- | --- | --- | --- |
| USG Fiber Reinforced Gypsum | 66 | 0.50 | 30 |
| GP DensDeck Duragaurd Roof Board | 48 | 0.50 | 12 |
| GP DensDeck Roof Board | 48 | 0.50 | 8 |
| Plywood | 34 | 0.50 | 6.5 |
| USG Securock (Gypsum with Glass Mat Surface) | 41 | 0.50 | 6 |
| USG Cement Roof Board | 58 | 0.50 | 6 |
| GP DensDeck Prime Roof Board | 48 | 0.50 | 6 |
| OSB | 40 | 0.50 | 5.3 |
| Wood/Plastic Composite (60% Polypropylene, 40% Wood Fiber) | 65 | 0.50 | 2.2 |

TABLE 2-continued

Minimum Bending Radius Values for Roofing
Cover Boards and Other Materials

| Panel Type | Density (lb/ft³) | Thickness (inches) | Minimum Bending Radius (ft) |
|---|---|---|---|
| Wood/Plastic Composite (57% Polypropylene, 40% Wood Flour, 3% Compatiblizer) | 65 | 0.50 | 1.9 |
| Panel from Example 1 | 55 | 0.50 | 0.69 |

Note:
Minimum bending radius values for the USG and GP panels were reported in product literature from each company. All other minimum bending radius values shown were calculated based on flexural MOE and MOR values.

The following calculations were used to determine minimum bending radius values: Flexural MOR=3FL/2bd² (center-point bending)

$$\text{Flexural MOE}=L^3m/4bd^3 \text{ (center-point bending)}$$

$$\text{Circle Arc Equation: } L=2r\cos^{-1}(1-(h/r))$$

Where,
F=force applied to the center of a beam
L=beam span or length of arc
b=beam width
d=beam depth
m=slope of beam deflection curve (F/h)
r=radius The data shown in Table 2 provide a clear demonstration that the properties of the panel described in Example #1 of this application are unique for a roofing panel and beneficial in terms of flexibility. In fact, the flexibility of the panel described in Example #1 is greater than that of traditional wood plastic composites, even those with only 40% wood content.

Previous panels have been created using composites that utilize raw materials based on waste streams. For example, U.S. Pat. No. 8,394,505 describes a building and construction element that contains a basic layer of pressed pulp of laminated food packages (column 1, lines 42-43). The laminated food packages are described as being made of paper with walls on at least one side that are covered by a waterproof sheet (column 1, lines 19-21). The waterproof sheet is usually made of plastic or aluminum (column 1, line 22). An example of this type of packaging material is Tetra-Pak (column 1, line 24). In a preferred embodiment the basic layer is comprised of particles that have a dimension that is less than 30 mm (column 1, line 47). This basic layer is covered on at least one side with a plastic sheet and has outside cover layers (column 1, lines 43-44). The construction element is made by grinding Tetra-Pak packages into particles smaller than 30 mm and then washing and drying them. The ground particles are spread evenly on a sheet of paper. The top side of the Tetra-Pak particles is then covered with a plastic sheet, which is then covered with a cover layer. The top cover layer can be paper (column 2, line 25). The assembly is then pressed at 160-190° C. and is then cold-pressed (column 2, lines 12-21). The resulting board can have dimensions of 10 mm×2800 mm×1200 mm with a density of 800 kg/m³ and a bending strength of 5.5 MPa (column 2, lines 21-27). In English units the board would have dimensions of 0.394"×9.19'×3.94', a density of 49.9 lb/ft³, and a bending strength of 798 lb/in². The board is reportedly suitable for flooring applications as well as a ceramic tile substrate (column 2, lines 33-36). It can be laminated to insulating materials, such as foams, to make sandwich type panels (column 2, lines 37-47). The patent further describes the basic element laminated on one major surface to foam and laminated on the opposing major surface to aluminum or a plastic sheet (column 2, lines 55-57).

There are some key differences between the composition described in U.S. Pat. No. 8,394,505 and the composition of the exemplary embodiments of the present disclosure. The basic particle used in the core of the composite described in U.S. Pat. No. 8,394,505 is a laminate comprised of paper and either aluminum or plastic, while the basic particles described in the exemplary embodiments are paper fragments (not laminated) and polypropylene fragments (not laminated). Likewise, the technology described in U.S. Pat. No. 8,394,505 does not use a secondary adhesive in the core layer. Presumably, plastic that is laminated to the paper acts as an adhesive described by U.S. Pat. No. 8,394,505. To the extent that this is true, the effective adhesive distribution is different in U.S. Pat. No. 8,394,505 than it is in the exemplary embodiments. Specifically, the adhesive in the core layer of the exemplary embodiments will be more randomly distributed relative to the paper fragments, while many of the paper particles in the core layer of the technology described by U.S. Pat. No. 8,394,505 will have plastic adhesive over 100% of the surface area on at least one of their major surfaces. Additionally, the technology described by U.S. Pat. No. 8,394,505 will contain significant levels of aluminum in the core layer, while the exemplary embodiments have a core layer that is essentially free of aluminum or other metals. Furthermore, the exemplary embodiments utilize discrete polypropylene fragments in the core layer, whereas the technology described by U.S. Pat. No. 8,394,505 does not utilize any polypropylene fragments. These compositional differences in the core layer are meaningful and they result in significant property differences. For instance, the bending strength of the board made in accordance with U.S. Pat. No. 8,394,505 is about half of that associated with the board made using the exemplary embodiments (798 lb/in² vs 1600 lb/in²).

U.S. Patent Publication 2019/0119918 is directed towards a roof cover board that includes a core that is comprised of recycled materials (0005). The core of the composite can be made by shredding recycled materials and then heating and compressing them to form a core (0016). Reportedly, no additional binders are used (0016). Facing layers are attached to the major surfaces of the core and include paper and fiberglass (0018). Facers can be attached to the core by use of the plastic within the core. Thus, secondary adhesive between the core and the facing layers is not required (0020). A key feature of the core layer is the existence of horizontal regions of the board that contain elevated levels of plastic (0023, 0024). These regions are targeted towards zones of the panel that will receive mechanical fasteners. The high plastic regions reportedly improve fastener retention and provide enhanced sealing (0023). The publication is somewhat vague with regard to a compositional description of the composite. Likewise, the publication provides no examples or measured properties. A key characteristic of the core of the composite is the existence of horizontal zones that are targeted for receiving fasteners and contain elevated levels of plastic. This design is different than that of the exemplary embodiments. Use of supplemental adhesives and other additives in the exemplary embodiments would appear to be outside of concepts that were contemplated by the publication.

Prior panel technologies fail to address specific design features of the panel related to adhesive compatibility, rain The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A cover board product with a panel comprising:
   a top surface layer comprised of paper or a fiberglass web;
   a bottom surface layer comprised of paper, a fiberglass web, nylon film, polyester film, polypropene film, or textiles; and
   a core layer comprised of paper and thermoplastic fragments connected by a thermoplastic bonding resin, wherein the thermoplastic bonding resin is in a random pattern to less than 100% of surface area of the paper fragments and thermoplastic fragments.

2. The cover board product of claim 1, wherein the thermoplastic includes thermoplastic polyolefin.

3. The cover board product of claim 1, wherein different fragment types are randomly distributed in the core layer relative to each other.

4. The cover board product of claim 1, wherein the core layer includes voids in and around the paper and thermoplastic fragments.

5. The cover board product of claim 1, wherein the core layer is attached to the top and bottom surface layers by use of a thermoplastic adhesive, including polyethylene.

6. The cover board product of claim 1, wherein the paper and thermoplastic fragments are uniformly distributed in the core layer relative to each other.

7. The cover board product of claim 1, wherein the core layer includes odor blockers.

8. The cover board product of claim 1, wherein the paper and thermoplastic fragments comprise municipal waste, waste, or recycled content.

9. The cover board product of claim 1, further comprising another layer on top of the top surface layer.

10. The cover board product of claim 9, wherein the another layer is comprised of consolidated polypropylene fragments.

11. The cover board product of claim 9, wherein the another layer is comprised of two or more of stone, glass, dust, or wood chips.

12. The cover board product of claim 9, wherein the another layer is comprised of one or more of plastic sheets, resin impregnated paper, melamine coatings, metals, or fabrics.

13. The cover board product of claim 1, further comprising another layer in between the top surface layer and the core layer.

14. The cover board product of claim 13, wherein the another layer is comprised of polyether ether ketone polymer (PEEK).

15. The cover board product of claim 1, wherein the paper of the bottom layer is coated with one or more of a phenolic resin or an amino resin.

16. The cover board product of claim 1, wherein composition of the bottom layer has a melting point greater than 400 degrees Fahrenheit.

17. The cover board product of claim 1, wherein the fiberglass web has a flame spread rating of Class 'A' in the ASTM E84 test.

18. The cover board product of claim 1, wherein the fiberglass web includes an intumescent coating.

19. The cover board product of claim 1, wherein the paper fragments in the core layer have a thickness less than 0.050 of an inch.

20. The cover board product of claim 1, wherein the core layer comprises a first concentration of the paper fragments of 30-70%, a second concentration of thermoplastic polyolefins fragments of 5-30%, and a third concentration of the thermoplastic bonding resin of 10-40%.

* * * * *